US006816757B1

(12) United States Patent
De La Ree et al.

(10) Patent No.: US 6,816,757 B1
(45) Date of Patent: Nov. 9, 2004

(54) CONTROL UNIT FOR A POWER-DISTRIBUTION NETWORK

(75) Inventors: Jaime De La Ree, Blacksburg, VA (US); James D. Stoupis, Raleigh, NC (US); Jeffrey L. McElray, Wendell, NC (US); Carl J. LaPlace, Raleigh, NC (US); Timothy Fahey, Apex, NC (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 10/247,191

(22) Filed: Sep. 19, 2002

(51) Int. Cl.[7] .......................... G06F 19/00; G01R 21/00; G05B 9/02
(52) U.S. Cl. ............................. 700/286; 700/79; 702/60
(58) Field of Search ................................ 700/4, 79, 90, 700/286; 702/57, 60, 62; 324/76.11; 713/340

(56) References Cited

U.S. PATENT DOCUMENTS

| | | | |
|---|---|---|---|
| 4,477,809 A | 10/1984 | Bose | 340/825.54 |
| 5,224,011 A | 6/1993 | Yalla et al. | 361/93 |
| 5,303,112 A | * 4/1994 | Zulaski et al. | 361/67 |
| 5,568,399 A | 10/1996 | Sumic | 364/492 |
| 5,574,611 A | 11/1996 | Nishijima et al. | 361/64 |
| 5,629,825 A | 5/1997 | Wallis et al. | 361/64 |
| 5,784,237 A | 7/1998 | Velez | 361/62 |
| 5,793,750 A | 8/1998 | Schweitzer, III et al. | 370/242 |
| 5,808,902 A | 9/1998 | Levert et al. | 364/492 |
| 5,896,302 A | 4/1999 | Goodpaster | 364/528.27 |
| 5,903,594 A | 5/1999 | Saulnier et al. | 375/200 |
| 5,973,899 A | 10/1999 | Williams et al. | 361/72 |
| 6,008,971 A | 12/1999 | Duba et al. | 361/64 |
| 6,111,735 A | 8/2000 | Nelson et al. | 361/64 |
| 6,160,690 A | 12/2000 | Matsumoto et al. | 361/62 |
| 6,243,244 B1 | 6/2001 | Nelson et al. | 361/64 |
| 6,259,972 B1 | 7/2001 | Sumic et al. | 700/286 |
| 6,285,917 B1 | 9/2001 | Sekiguchi et al. | 700/239 |
| 6,292,340 B1 | 9/2001 | O'Reagan et al. | 361/78 |
| 6,297,939 B1 | 10/2001 | Bilac et al. | 361/64 |
| 6,341,054 B1 | 1/2002 | Walder et al. | 361/66 |
| 6,347,027 B1 | 2/2002 | Nelson et al. | 361/64 |
| 6,405,104 B1 | 6/2002 | Dougherty | 700/292 |
| 2002/0015271 A1 | 2/2002 | Meisinger, Sr. et al. | 361/84 |

FOREIGN PATENT DOCUMENTS

| | | |
|---|---|---|
| JP | 402241333 A | 9/1990 |
| JP | 405137250 A | 6/1993 |

OTHER PUBLICATIONS

De La Ree, J., et al. "An Adaptive Protection Scheme For Power Distribution Systems," Sep. 23, 2002.
Hart, David G., et al., "Automated Solutions For Distribution Feeders," IEEE Computer Applications In Power, Oct. 2000.
McElray, J.L, et al., "Loop Control Schemes Increase Restoration," IEEE/PES 2001 Transmission and Distribution Conference and Exposition, Oct. 28–Nov. 2, 2001.
ETI Report No. EST–R–01147, "Advanced Feeder Automation: New DA Switch Communication Schemes," Aug. 13, 2001.

\* cited by examiner

*Primary Examiner*—Jayprakash N. Gandhi
(74) *Attorney, Agent, or Firm*—Woodcock Washburn LLP

(57) ABSTRACT

A preferred embodiment of control unit for a power-distribution network comprises a processor, a memory-storage device electrically coupled to the processor, a set of computer-executable instructions stored on the memory-storage device, and an input/output interface electrically coupled to the processor. The control unit receives data from a plurality of switching devices of a power-distribution network, identifies ones of the switching devices located immediately up-line and down-line of a fault in a faulted section of the power-distribution network based on predetermined characteristics of the data, and generates and sends a first control input to at least one of the switching devices located immediately up-line and down-line of the fault to cause the at least one of the switching devices to open and thereby isolate the faulted section from a second section of the power-distribution network.

37 Claims, 5 Drawing Sheets

CONTROL UNIT FOR A POWER-DISTRIBUTION NETWORK

FIELD OF THE INVENTION

The present invention relates power-distribution networks. More particularly, the invention relates to a control unit that identifies and isolates faults in a power-distribution network.

BACKGROUND OF THE INVENTION

Power-distribution networks typically deliver electrical power to consumers using an interconnected arrangement of transmission lines, distribution buses, distribution feeders, etc. Power-distribution networks are typically configured so that electrical power can be delivered over more than one path within the network. Moreover, power-distribution networks are often configured so that power can be delivered from two or more alternative sources (although only one source can supply the network at a given instant). Configuring a power-distribution network in this manner reduces the potential for a single-point fault to leave large numbers of users without electrical power.

Power-distribution networks are commonly equipped with sectionalizers that permit a section of the network to be isolated from its neighboring sections on a selective basis. The feature permits a faulted section of the network, i.e., a section of the network having a fault therein, to be de-energized and isolated so that other sections of the network can be re-energized after the occurrence of the fault.

Power-distribution networks are also commonly equipped with reclosers. Reclosers trip, or open, in response to an overcurrent condition, thereby interrupting the flow of electrical power and clearing the fault condition on at least a temporary basis. A typical recloser also closes after a predetermined interval to restore the flow of electrical power to the network. A reoccurrence of the fault upon closing will cause the recloser to once again trip. Transient-type faults can sometimes be cleared by repeated closings and openings of the recloser. Hence, the recloser may be closed several times following each trip until the fault clears, or until a predetermined number of closings have occurred. Reclosers can thus eliminate prolonged power outages and unnecessary service calls caused by a transient fault.

The reclosers and sectionalizers of a power-distribution network can be connected to a centralized communication unit that facilitates communication between the reclosers and sectionalizers. This feature permits the reclosers and sectionalizers to share operational information, via the communications unit, such as open-closed status, load condition, etc. The reclosers and sectionalizers can thus operate in a coordinated manner, i.e., each recloser and sectionalizer can open or close itself based on the operational status of the other reclosers or sectionalizers. Coordinating the operation of the reclosers and sectionalizers in this manner permits faulted sections of the power distribution network to be isolated, and allows power to be restored to sections in which a fault is not present (provided an alternative power source is available).

A centralized communication unit, however, merely facilitates the sharing of information among the reclosers and sectionalizers. The reclosers and sectionalizers must still perform the decision-making processes necessary to isolate faulted sections of the power distribution network, and to restore power to sections in which a fault is not present Hence, each of the reclosers and sectionalizers must be equipped with the hardware, firmware, and software to enable the recloser or sectionalizer to perform the required decision-making processes. This requirement can substantially increase the cost and complexity of the power distribution network.

Power-distribution networks that are not equipped with a centralized communications unit often rely on repeated closings and openings of a recloser to identify and isolate a faulted section. For example, the sectionalizers downstream of the recloser, i.e., the sectionalizers separated from the voltage source by the recloser, can be programmed to open on a sequential basis after the recloser has cycled through a predetermined number of closings and openings. More particularly, the sectionalizer located farthest from the recloser in the network can be programmed to open after the recloser has closed and reopened a predetermined number of times, e.g., two (this can be accomplished by programming the sectionalizer to open after a predetermined amount of time has elapsed following a drop in the voltage or current in the sectionalizer).

The sectionalizer located immediately upstream of the open sectionalizer can be programmed to open after the next closing and reopening the recloser. This process occurs for each subsequent upstream sectionalizer until the recloser remains closed, i.e., until the faulted section is no longer energized upon the closing of the recloser. This approach is time consuming in comparison to the use of a centralized communications unit to facilitate coordinated operation among the reclosers and sectionalizers. Moreover, power cannot be restored to un-faulted sections located downstream of the faulted section, i.e., to un-faulted sections separated from the voltage source by the faulted section, using this approach.

SUMMARY OF THE INVENTION

A preferred embodiment of control unit comprises a processor, a memory-storage device electrically coupled to the processor, a set of computer-executable instructions stored on the memory-storage device, and an input/output interface electrically coupled to the processor. The control unit receives data from a plurality of switching devices of a power-distribution network, and identifies ones of the switching devices located immediately up-line and down-line of a fault in a faulted section of the power-distribution network based on predetermined characteristics of the data. The control unit also generates and sends a first control input to at least one of the switching devices located immediately up-line and down-line of the fault to cause the at least one of the switching devices to open and thereby isolate the faulted section from another section of the power-distribution network.

Another preferred embodiment of a control unit for a power-distribution network comprises a central processing unit comprising a processor, a memory-storage device electrically coupled to the processor, and a set of computer-executable instructions stored on the memory-storage device. The control unit also comprises an input/output interface electrically coupled to the central processing unit The input/output interface receives inputs from a first and a second switching device of the power-distribution network, the inputs being indicative of a load condition on each of first and second switching devices. The central processing unit detects the presence a fault in a first section of the power-distribution network located between the first and second switching devices by comparing the input from the first switching device with the input from the second switching device. The central processing unit generates a control input in response to the detection of the fault. The input/output interface sends the control input to at least one of the first and second switching devices, and the control input causes the at least one of the first and second switching devices to reconfigure itself to isolate the first section of the power-distribution network from a second section of the power-distribution network.

A preferred embodiment of a power-distribution network comprises a first switching device electrically coupled to a first voltage source and a first section of a first distribution feeder. The first switching device isolates the first section from the first voltage source in response to an overcurrent condition in the first distribution feeder. The power-distribution network also comprises a second switching device electrically coupled to the first section and a second section of the first distribution feeder. The second switching device isolates the first section from the second section on a selective basis.

The power-distribution network also comprises a third switching device electrically coupled to the second section and a third section of the first distribution feeder. The third switching device isolates the second section from the third section on a selective basis. The power-distribution network further comprises a control unit comprising a processor, a memory-storage device electrically coupled to the processor, a set of computer-executable instructions stored on the memory-storage device, and an input/output interface.

The control unit communicates with at least the first, second and third switching devices, detects the presence a fault in one of the first, second, and third sections by comparing loading conditions of the first, second, and third switching devices, and generates and sends a control input to at least one of the second and third switching devices to cause the at least one of the second and third switching devices to isolate one of the first, second, and third sections from another of the first, second, and third sections.

Another preferred embodiment of a power-distribution network comprises a first voltage source, a first switching device electrically coupled to the voltage source, a second switching device electrically coupled to the first switching device down-line of the first switching device in relation to the first voltage source, and a third switching device electrically coupled to the second switching device down-line of the second switching device in relation to the first voltage source.

The power-distribution network also comprises a control unit for receiving data from at least the second and third switching devices, detecting a fault in a first section of the power-distribution network located between the second and third switching devices based on predetermined characteristics of the data, and generating and sending a first control input to at least one of the second and third switching devices to cause the at least one of the second and third switching devices to open and thereby isolate the first section from a second section of the power-distribution network.

A presently-preferred method comprises reading data from a plurality of switching devices of a power-distribution network, and identify ones of the switching devices located immediately up-line and down-line of a fault in a faulted section of the power-distribution network based on predetermined characteristics of the data. The method also comprises generating and sending a first control input to at least one of the switching devices located immediately up-line and down-line of the fault to cause the at least one of the switching devices to open and thereby isolate the faulted section from another section of the power-distribution network.

A presently-preferred method comprises receiving inputs from a first and a second switching device of a power-distribution network indicating a load condition on each of first and second switching devices, and detecting the presence a fault in a first section of the power-distribution network located between the first and second switching devices by comparing the input from the first switching device with the input from the second switching device. The method also comprises generating a control input in response to the detection of the fault, and sending the control input to at least one of the first and second switching devices, the control input causing the at least one of the first and second switching devices to reconfigure itself to isolate the first section of the power-distribution network from a second section of the power-distribution network.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

Figure 1:
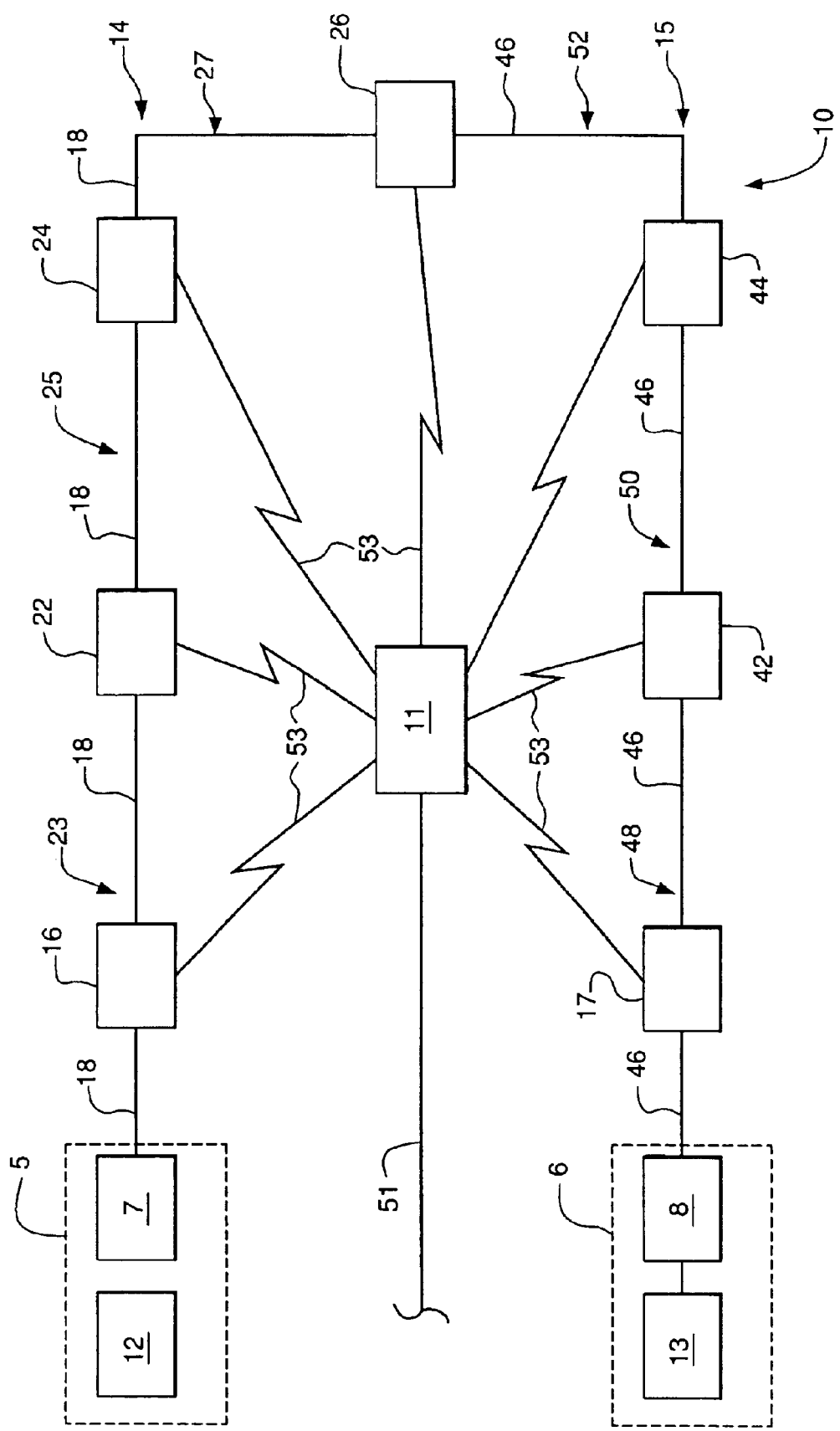
FIG. 1 is a block diagram depicting a power-distribution network equipped with a preferred embodiment of a control unit.
Figure 2:
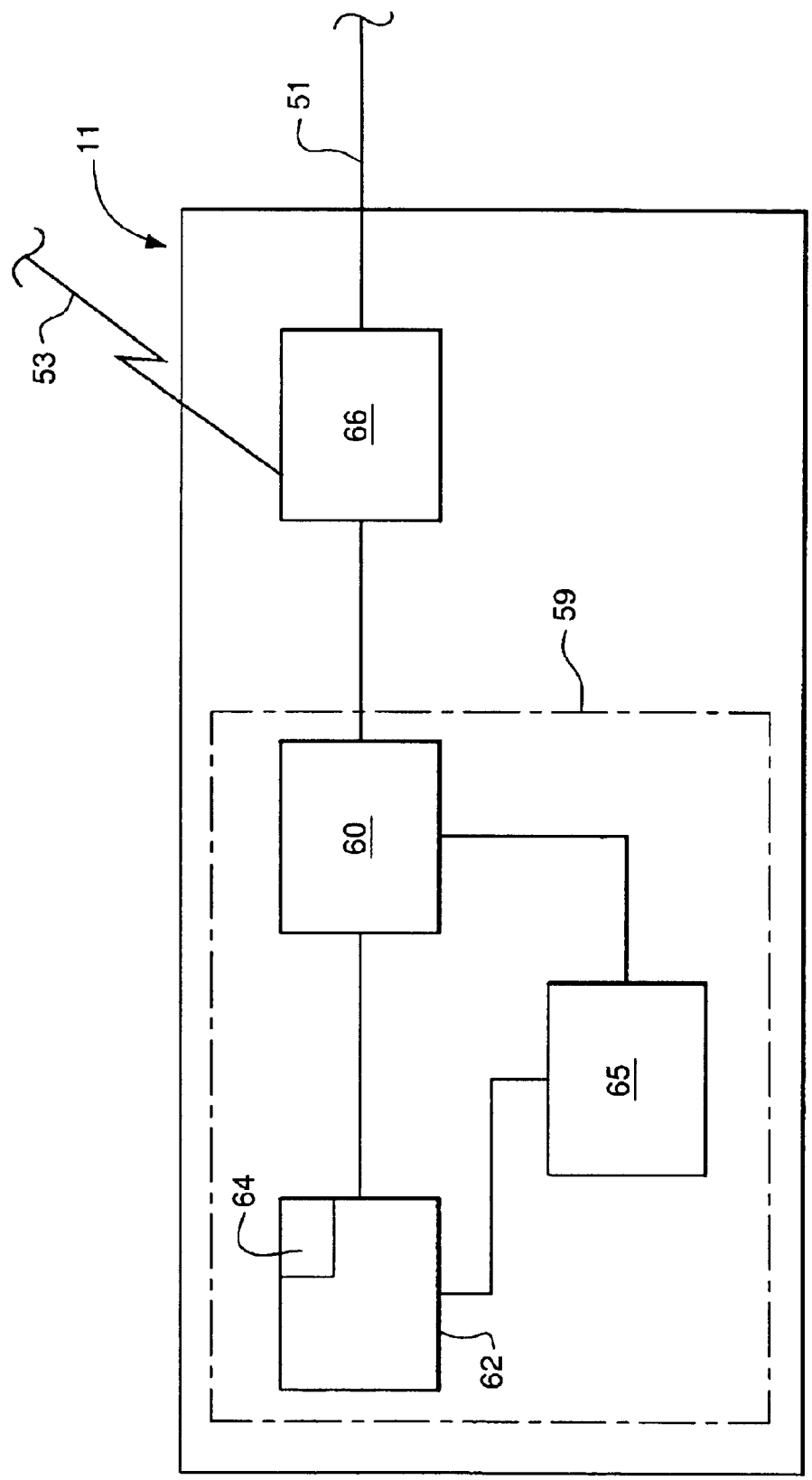
FIG. 2 is a block diagram depicting the control unit shown in FIG. 1.

FIGS. 1–4 depict a power-distribution network 10 comprising a preferred embodiment of a control unit 11. The power-distribution network 10 also comprises a first substation 5 and a second substation 6 (see FIG. 1). The first substation 5 comprises a first voltage source 12, and a first circuit breaker 7 electrically coupled to the first voltage source 12. The second substation 6 comprises a second voltage source 13, and a second circuit breaker 8 electrically coupled to the second voltage source 13.

The power-distribution network 10 further comprises a first above-ground, radial-distribution feeder 14, and a second above-ground, radial distribution feeder 15. The first distribution feeder 14 is electrically coupled to the first substation 5, and the second distribution feeder 15 is electrically coupled to the second substation 6. The first and second circuit breakers 7, 8 are closed during normal operation of the first and second distribution feeders 14, 15, i.e., when the first and second distribution feeders 14, 15 are operating without a fault therein. The first and second distribution feeders 14, 15 are thus energized by the respective first and second voltage sources 12, 13 under normal operating conditions.

The control unit 11 is preferably a programmable-logic controller of conventional design. The control unit 11 comprises a central processing unit 59, and an input/output ("I/O") interface 66 electrically coupled to the central processing unit 59 (see FIG. 2).

The central processing unit 59 comprises a processor 60, a memory-storage device 62 electrically coupled to the processor 60, a set of computer-executable instructions 64 stored on the memory-storage device 62, and a power supply 65 electrically coupled to the processor 60 and the memory-storage device 62. A Modicon Compact-984-120/130 Programmable Controller can be used as the control unit 11. (It should be noted that this particular type and model of programmable-loop controller is specified for exemplary purposes only; virtually any type of process controller can be used as the control unit 11.)

The control unit 11 communicates with various components of the power-distribution network 10, and detects the presence and location of faults within the first and second distribution feeders 14, 15. The control unit 11 also controls various components of the power-distribution network 10 so as to isolate sections of the first and second distribution feeders 14, 15 in which a fault is present, and to restore power to sections of the distribution feeders 14, 15 in which a fault is not present. Further details relating to these features are presented below.

The control unit 11 preferably communicates with a central data base or monitoring station (not shown) by way of the I/O interface 66. More particularly, the I/O interface 66 is electrically coupled to a data link, e.g., a supervisory control and data acquisition (SCADA) data link 51 (see FIGS. 1 and 2). The control unit 11 generates and sends data relating to the status, maintenance requirements, operating history, load conditions, etc. of the power distribution network 10 to the data base or central monitoring station by way of the I/O interface 66 and the SCADA data link 51.

The first distribution feeder 14 comprises a first recloser 16. The first recloser 16 is electrically coupled to the first circuit breaker 7. The first recloser 16 comprises an interrupting mechanism 28, and a controller 30 electrically coupled to the interrupting mechanism 28 (see FIG. 3). A suitable interrupting mechanism 28 can be obtained from ABB Inc. as the type VR-3S interrupting mechanism. A suitable controller can be obtained from ABB Inc. as the PCD2000-type controller. (The use of this particular type of interrupting mechanism and controller is disclosed for exemplary purposes only, as the control unit 11 can be adapted for use with virtually any type of interrupting mechanism and controller.)

The controller 30, upon sensing a fault, i.e., an overcurrent condition, in the distribution feeder 14, generates an output. This output, when received by the interrupting mechanism 28, causes the interrupting mechanism 28 to move to its "open" position, thereby opening (or "tripping") the first recloser 16. The controller 30 is responsive to various fault types including, for example, three-phase, phase-to-phase, two-phase to-ground, and phase-to-ground faults. Opening the first recloser 16 in this manner isolates the voltage source 12 from the portion of the distribution feeder 14 located on the load-side (down-line side) of the first recloser 16, i.e., on the side of the first recloser 16 opposite the voltage source 12.

The controller 30 generates another output after the interrupting mechanism 28 has been open for a predetermined interval. This output, when received by the interrupting mechanism 28, causes the interrupting mechanism 28 to move to its closed position; thereby closing the first recloser 16. The closure of the first recloser 16 in this manner (commonly referred to as a "shot") reestablishes electrical contact between the voltage source 12 and the portion of the distribution feeder 14 located on the load-side of the first recloser 16.

The first recloser 16 remains closed after the initial reclosure (shot) if the fault in the distribution feeder 14 has cleared, i.e., if the fault is transient, rather than permanent, in nature. The controller 30 generates an output that, when received by the interrupting mechanism 28, causes the first recloser 16 to open if the fault has not cleared, i.e., if the overcurrent condition reoccurs once the first recloser 16 closes. Further details relating to the operation of the first recloser 16 are presented below.

The first recloser 16 communicates with the control unit 11. More particularly, the controller 30 of the first recloser 16 sends and receives information to and from the I/O interface 66 of the control unit 11. The I/O interface and the recloser 16 communicate by way of a master-slave radio communication link (represented by the lines 53 in the figures). This particular type of communication link is specified for exemplary purposes only. Other types of communication links such as conventional or fiber-optic cable, broadcast radio, point to multi-point network, modem, RS485 interface converter, etc. can be used in the alternative.

The second distribution feeder 15 comprises a second recloser 17. The second recloser 17 is electrically coupled to the second circuit breaker 8. The second recloser 17 is substantially identical to the first recloser 16 from a structural and an operational standpoint. A detailed description of the second recloser 17 therefore is not presented herein. Individual components of the first recloser 17 are hereinafter referred to using reference numerals identical those used in reference to the corresponding components in the first recloser 16.

The second recloser 17 opens in response to an overcurrent condition down-line of the second recloser 17, as described above in relation to the first recloser 16. More particularly, the controller 30 of the second recloser 17, upon sensing a fault in the second distribution feeder 15, generates an output. This output, when received by the interrupting mechanism 28 of the second recloser 17, causes the interrupting mechanism 28 to move to its "open" position, thereby opening (or "tripping") the first recloser 16. The controller 30 of the second recloser 17 is responsive to various fault types including, for example, three-phase, phase-to-phase, two-phase to-ground, and phase-to-ground faults. Opening the second recloser 17 isolates the second voltage source 13 from the portion of the second distribution feeder 15 located on the load-side of the second recloser 17.

The controller 30 of the second recloser 17 generates another output after the interrupting mechanism 28 of the second recloser 17 has been open for a predetermined interval. This output, when received by the interrupting mechanism 28 of the second recloser 17, causes the interrupting mechanism 28 to move to its closed position, thereby closing the second recloser 17. The closure of the second recloser 17 in this manner reestablishes electrical contact between the second voltage source 13 and the portion of the second distribution feeder 15 located on the load-side of the second recloser 17.

The second recloser 17 remains closed after the initial reclosure (shot) if the fault in the second distribution feeder 15 has cleared, i.e., if the fault is transient, rather than permanent, in nature. The controller 30 of the second recloser 17 generates an output that, when received by the interrupting mechanism 28 of the second recloser 17, causes the second recloser 17 to open if the fault has not cleared, i.e., if the overcurrent condition reoccurs once the second recloser 17 closes. Further details relating to the operation of the second recloser 17 are presented below.

The second recloser 17 communicates with the control unit 11 in a manner substantially identical to that described above in relation to the first recloser 16.

The first distribution feeder 14 comprises a first sectionalizer 22, a second sectionalizer 24, and a cable 18 (see FIG. 1). The first and second sectionalizers 22, 24 are arranged in series with the recloser 16. More particularly, the first sectionalizer 22 is electrically coupled to the first recloser 16 by the cable 18, and the second sectionalizer 24 is electrically coupled to the first sectionalizer 22 by the cable 18.

The power-distribution network 10 also comprises a third sectionalizer 26 electrically coupled to the second sectionalizer 24 by the cable 18.

The sectionalizers 22, 24, 26 divide, or sectionalize, the distribution feeder 14 into a first, a second, and a third section 23, 25, 27. The first section 23 is located between the first recloser 16 and the first sectionalizer 22, the second section 25 is located between the first and second sectionalizers 22, 24, and the third section 27 is located between the second and third sectionalizers 24, 26. Various electrical loads (not pictured) can be electrically coupled to and energized by each of the first, second, and third sections 23, 25, 27.

Figure 4:
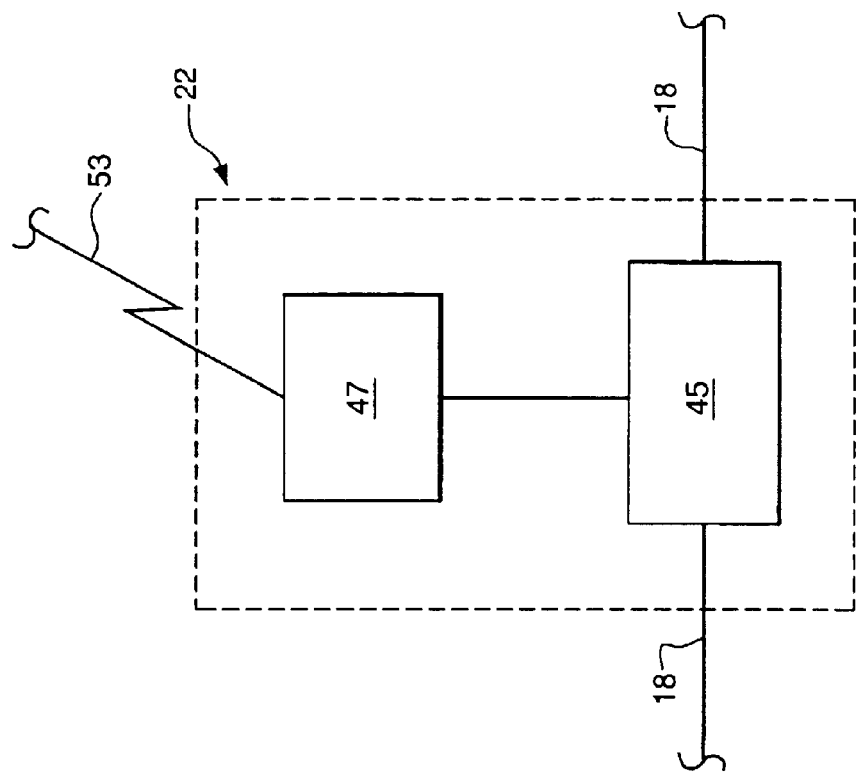
FIG. 4 is a block diagram depicting a sectionalizer of the power-distribution network shown in FIG. 1.
Figure 3:
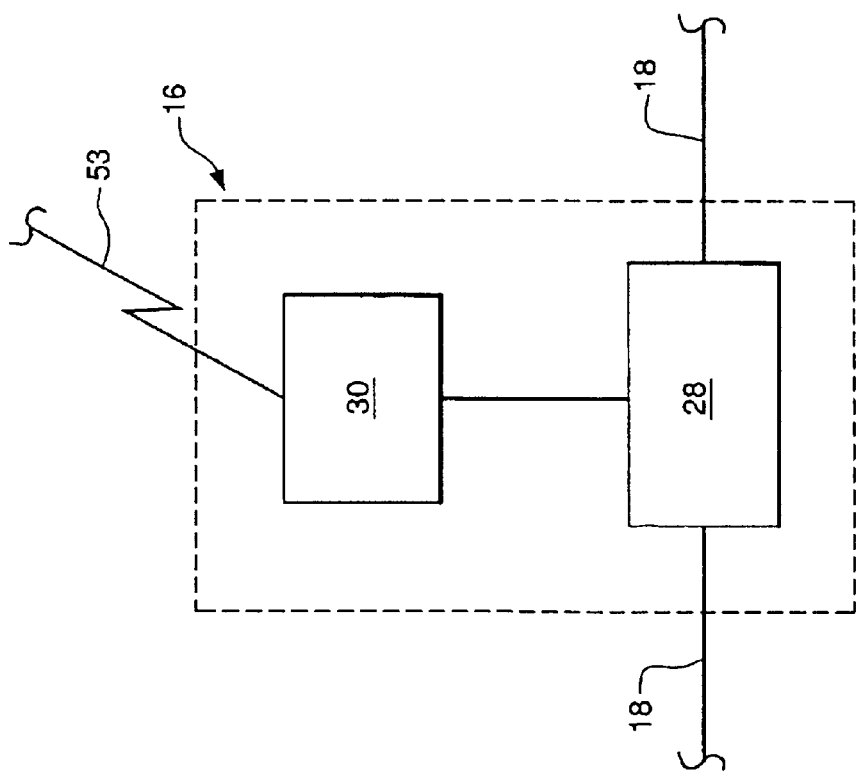
FIG. 3 is a block diagram depicting a recloser of the power-distribution network shown in FIG. 1.

The first sectionalizer 22 comprises a switch 45, and a controller 47 electrically coupled to the switch 45 (see FIG. 4). A suitable switch 46 can be obtained from ABB Inc. as the VS-3S switch. The controller 47 is substantially similar to the controller 30. A suitable controller 47 can be obtained from ABB Inc. as the SCD2000 controller. (The use of this particular type of switch and controller is disclosed for exemplary purposes only, as the control unit 11 can be adapted for use with virtually any type of switch and controller.)

The first sectionalizer 22 communicates with the control unit 11 in the manner described above in relation to the first recloser 16. More particularly, the first sectionalizer 22 sends and receives information to and from the I/O interface 66 of the control unit 11 by way of the radio communication link 53.

The first sectionalizer 22 to opens and closes in response to outputs generated by the control unit 11. More particularly, the controller 47, upon receiving an input in the form of an "open" or "close" command from the control unit 11, generates an output. This output, when received by the switch 45, causes the switch to move its "open" or "closed" position, thereby opening or closing the first sectionalizer 22.

Opening the first sectionalizer 22 isolates the first voltage source 12 from the portion of the first distribution feeder 14 located on the load-side (down-line side) of the first sectionalizer 22, i.e., from the portion of the first distribution feeder 14 located on the side of the first sectionalizer 22 opposite the first voltage source 12.

The first sectionalizer 22 is closed during normal, i.e., fault-free, operation of the first distribution feeder 14. Hence, the first and second sections 23, 25 of the distribution feeder 14 are electrically coupled during normal operation of the distribution feeder 14. The first sectionalizer 22, unlike the first and second reclosers 16, 17, does not open in direct response to a fault in the first distribution feeder 14.

The second and third sectionalizers 24, 26 are substantially identical to the first sectionalizer 22. A detailed description of the second and third sectionalizers 24, 26 therefore is not presented herein. Moreover, the individual components of the second and third sectionalizers 24, 26 are hereinafter referred to using reference numerals identical to those used in reference to the corresponding components in the first sectionalizer 22. The second and third sectionalizers 22 communicate with the control unit 11 in a manner substantially identical to that described above in relation to the first sectionalizer 22.

The second sectionalizer 24 is closed during normal operation of the first distribution feeder 14. Hence, the second and third sections 25, 27 of the first distribution feeder 14 are electrically coupled during normal operation of the first distribution feeder 14. The sectionalizer 26 is electrically coupled to the second distribution feeder 15 (see FIG. 1). The third sectionalizer 26 is open during normal operation of the distribution feeder 14. Hence, the first distribution feeder 14 is isolated from the second distribution feeder 15 by the third sectionalizer 26 during normal operation of the first distribution feeder 14.

The second distribution feeder 15 comprises a fourth sectionalizer 42, a fifth sectionalizer 44, and a cable 46. The fourth and fifth sectionalizers 42, 44 are arranged in series with the second recloser 17. More particularly, the fourth sectionalizer 42, is electrically coupled to the second recloser 17 by the cable 46, and the fifth sectionalizer 44 is electrically coupled to the fourth sectionalizer 42 by the cable 46. Moreover, the fifth sectionalizer is electrically coupled to the third sectionalizer 26 by the cable 46. (The first and second distribution feeders 14, 15 thus form a loop arrangement in the power-distribution network 10).

The sectionalizers 42, 44, 26 divide, or sectionalize, the distribution feeder 14 into a fourth, a fifth, and a sixth section 48, 50, 52. The fourth section 48 is located between the second recloser 17 and the fourth sectionalizer 42, the fifth section 50 is located between the fourth and fifth sectionalizers 42, 44, and the sixth section 52 is located between the third and fourth sectionalizers 26, 44. Various electrical loads (not pictured) can be electrically coupled to and energized by each of the fourth fifth, and sixth sections 48, 50, 52.

The fourth and fifth sectionalizers 42, 44 are substantially identical to the first sectionalizer 22. A detailed description of the fourth and fifth sectionalizers 42, 44 therefore is not presented herein. Moreover, the individual components of the fourth and fifth sectionalizers 42, 44 are hereinafter referred to using reference numerals identical those used in reference to the corresponding components in the first sectionalizer 22.

The fourth and fifth sectionalizers 42, 44 communicate with the control unit 11 in the manner described above in relation to the first sectionalizer 22.

The fourth sectionalizer 42 is closed during normal operation of the second distribution feeder 15. Hence, the fourth and fifth sections 48, 50 of the second distribution feeder 15 are electrically coupled during normal operation of the second distribution feeder 15.

The fifth sectionalizer 44 is closed during normal operation of the second distribution feeder 15. Hence, the fifth and sixth sections 50, 52 of the second distribution feeder 15 are electrically coupled during normal operation of the second distribution feeder 15. The third sectionalizer 26 is open during normal operation of the distribution feeder 15. Hence, the first distribution feeder 14 is isolated from the second distribution feeder 15 by the third sectionalizer 26 during normal operation of the second distribution feeder 15.

The control unit 11 communicates with the first and second reclosers 16, 17, and with the first, second, third, fourth, and fifth sectionalizers 22, 24, 26, 42, 44, as noted above. (The first and second reclosers 16, 17 and the first, second, third, fourth, and fifth sectionalizers 22, 24, 26, 42, 44 are hereinafter referred to collectively as "the switching devices" of the power distribution network 10.) More particularly, the control unit 11 is gathers information from the switching devices, processes the information, and sends responsive commands to the switching devices.

The control unit 11 receives and processes the following inputs from the first recloser 16 (and the first recloser 16 thus generates and sends the following outputs to the control unit 11): (i) identification data, i.e., a code unique to the first recloser 16 and recognizable as such by the control unit 11; (ii) loading conditions, i.e., the line current and line voltage, by phase, in the recloser 16 immediately prior to the fault; (iii) the recloser count, i.e., the number of times the interrupting mechanism 28 of the recloser 16 has closed and reopened following the occurrence of a fault; (iv) the position (open or closed) of the interrupting mechanism 28; (v) the locked-out status of the recloser 16, i.e., whether the interrupting mechanism 28 has been locked in its "open" position; and (vi) the resistance down-line, i.e., on the load side, of the recloser 16 (if available). It should be noted that this particular set of information is specified for exemplary purposes only; the control unit 11 can be configured to receive and process other types of information from the recloser 16.

The control unit 11 generates and sends the following outputs to the first recloser 16 (and the first recloser 16 thus receives and processes the following outputs from the control unit 11): (i) a communication flag, i.e., a high-low signal indicating whether the control unit 11 is communicating with the first recloser 16; (ii) a status indication, i.e., a first high-low signal indicating whether the power distribution network 10 is operating normally, i.e., without a fault, and a second high-low signal indicating whether the control unit 11 is transmitting data to reconfigure the power-distribution network 10 so as to isolate a fault therein and re-energize un-faulted sections, (iii) an open-close command, i.e., a command that causes the controller 30 of the recloser 16 to open or close the interrupting mechanism 28 thereof; and (iv) a "lock-out" command, i.e., a command that causes the interrupting mechanism 28 of the recloser 16 to remain in the "open" position. It should be noted that this particular set of information is specified for exemplary purposes only; the control unit 11 can be configured to send other types of information to the recloser 16.

The control unit 11 receives, processes, and sends substantially identical types of information to and from the first and second reclosers 16, 17.

The control unit 11 receives and processes the following inputs from the first sectionalizer 22 (and the first sectionalizer 22 thus generates and sends the following outputs to the control unit 11): (i) identification data; (ii) loading conditions immediately prior to the fault; (iii) the open-closed status of the sectionalizer 22, and (iv) the resistance down-line of the sectionalizer 22 (if available). It should be noted that this particular set of information is specified for exemplary purposes only; the control unit 11 can be configured to receive and process other types of information from the sectionalizer 22.

The control unit 11 generates and sends the following outputs to the first sectionalizer 22 (and the first sectionalizer 22 thus receives and processes the following outputs from the control unit 11): (i) a communication flag; (ii) a status indication; (iii) an open-close command, i.e., a command that causes the controller 47 of the sectionalizer 22 to open or close the switch 45 thereof, and (iv) a "reverse polarity" command, i.e., a command that causes the sectionalizer 22 to reconfigure itself to reverse the direction in which the sectionalizer 22 is configured to transmit line current. It should be noted that this particular set of information is specified for exemplary purposes only; the control unit 11 can be configured to send other types of information to the sectionalizer 22.

The control unit 11 receives, processes, and sends substantially identical types of information to and from the second, third, fourth, and fifth sectionalizers 24, 26, 42, 44.

The control unit 11 detects the presence and location of faults within the first and second distribution feeders 14, 15, a noted above. The presence of a fault in a section of the power-distribution network 10 ahead of, i.e., down-line, or on the load-sid of, a particular one of the switching devices, in general, causes a substantial decrease in the line voltage and a substantial increase in the line current in the switching device.

The presence of a fault in a section of the power-distribution network 10 behind, i.e., upline, or on the voltage-source side of, a particular one of the switching devices usually causes a substantial decrease in both the line voltage and the line current in the switching device. (A fault in a section of the power-distribution network 10 behind the switching device, however, will cause a substantial decrease in the line voltage, a substantial increase in the line current, and a reversal in the power flow if a rotating-machinery-type load is coupled to the power-distribution network between the fault and the switching device.)

The control unit 11, through the computer-executable instructions 64, identifies the presence of a fault in the power-distribution network 10 by monitoring the load conditions of each of the switching devices. The computer-executable instructions 64 recognize the above-noted effects of a fault on the load conditions of the switching devices. The computer-executable instructions 64 interpret the presence of such effects as an indication that a fault is present.

Moreover, the control unit 11, through the computer-executable instructions 64, compares the load characteristics of the various switching devices to determine the section of the power-distribution network 10 in which the fault is located. In particular, the computer-executable instructions recognize the switching device located immediately up-line, i.e., on the voltage-source side, of the fault by comparing the load characteristics of the switching devices. (This particular switching device is hereinafter referred to as the "last forward switching device.") In other words, the last forward switching device is the switching device that, among the group of switching devices experiencing a substantial decrease in line voltage and a substantial increase in line current, is located farthest down-line in the first or second distribution feeder 14, 15.

The control unit 11 also recognizes the switching device located immediately down-line, i.e., on the load side, of the fault by comparing the load characteristics of the switching devices. (This particular switching device is hereinafter referred to as the "first backward switching device.") In other words, the first backward switching device is the switching device that, among the group of switching devices experiencing a substantial decrease in both line voltage and line current, or a substantial increase in line current and a reversal of power flow, is located farthest up-line in the first or second distribution feeder 14, 15.

The control unit 11 recognizes the section of the power distribution network 10 located between the last forward switching device and the first backward switching device as the section in which the fault is located. Moreover, the control unit 11 determines the location of the fault within the faulted section by comparing the down-line resistance reading from the last-forward switching device immediately prior to the fault with a corresponding, predetermined value for the down-line resistance when a fault is not present.

The control unit 11, upon identifying the section of the power-distribution network 10 in which the fault is present, issues control inputs to one or more of the switching devices to isolate the faulted section, and to re-energize the sections of the power-distribution network 10 in which a fault is not present. This process described hereinafter in reference to three different types of fault scenarios in the first distribution feeder 14, i.e., where a permanent fault is present in the first section 23 only, in the second section 25 only, and in the third section 27 only.

Figure 5A:
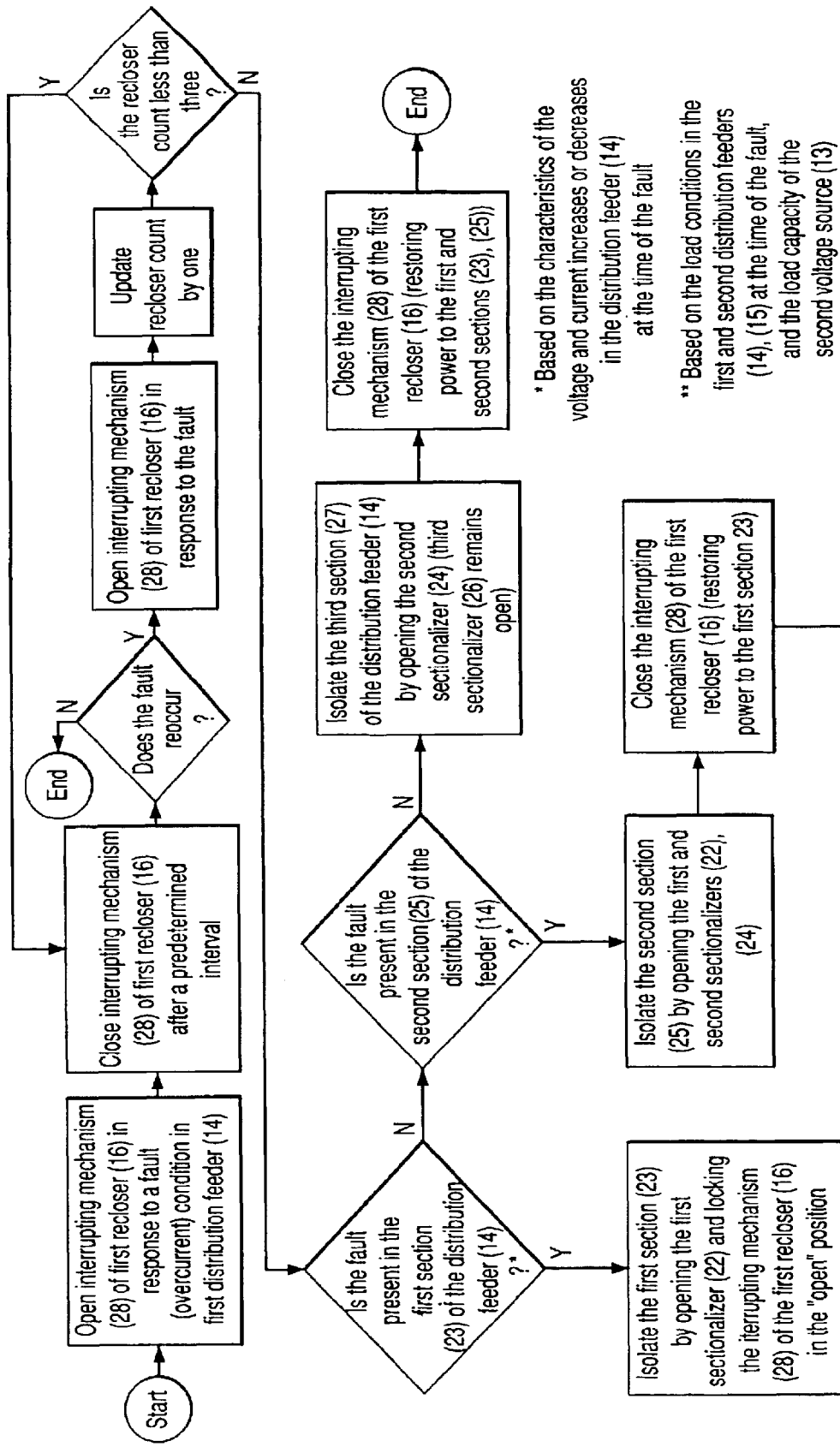
FIGS. 5A and 5B are a flow chart depicting the function of the control unit shown in FIGS. 1 and 2 in response to faults in various sections of the power-distribution network shown in FIG. 1.
Figure 5B:
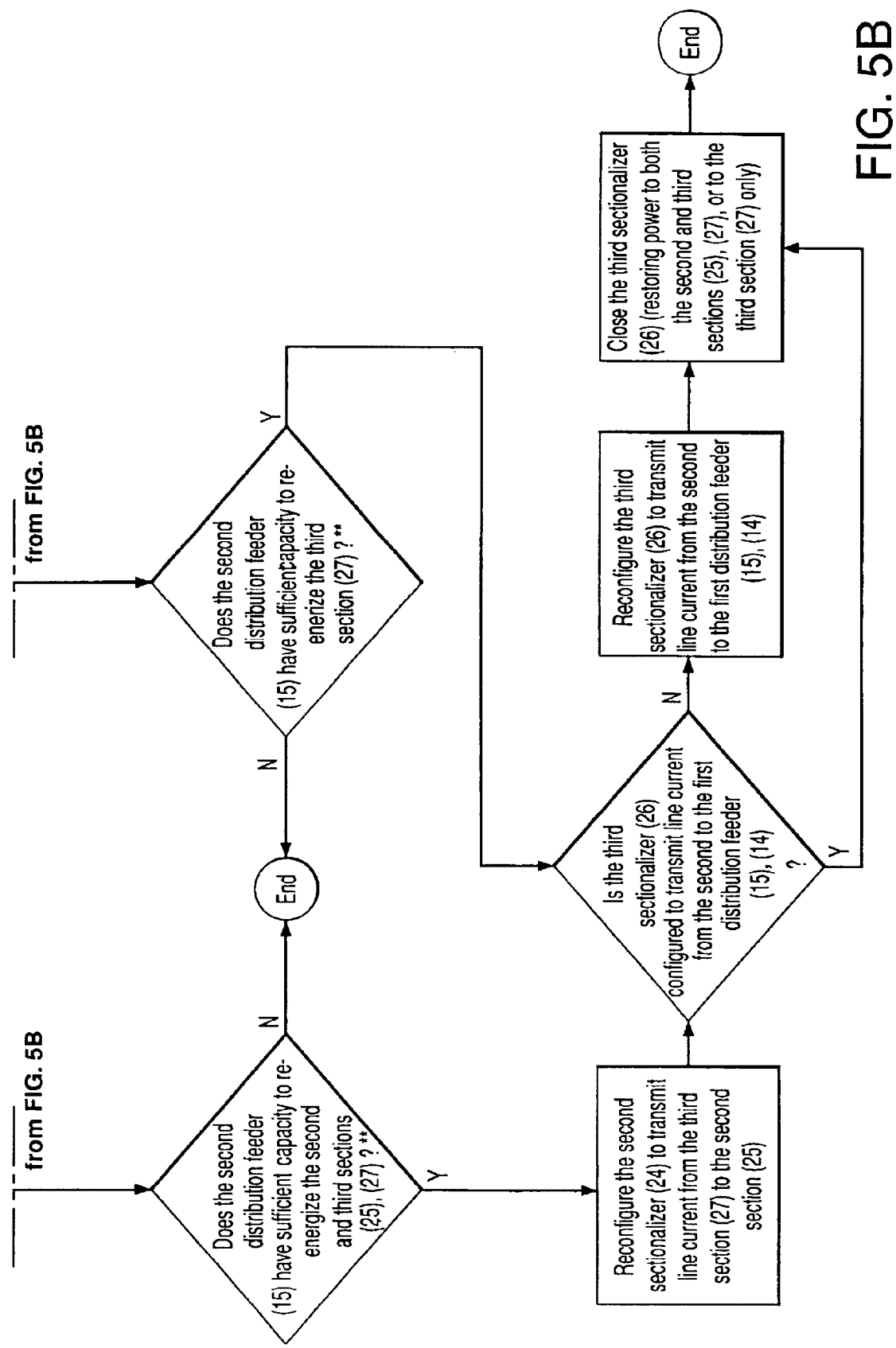

The occurrence of a permanent fault in the first section 23 of the distribution feeder 14 causes the following sequence of events in the network 10 (see FIGS. 5A and 5B).

A permanent fault in the first section 23 is initially sensed as an overcurrent condition by the controller 30 of the first recloser 16. The controller 30, in response, causes the interrupting mechanism 28 of the first recloser 16 to trip, or open, thereby clearing the fault temporarily and isolating the first distribution feeder 14 from the first voltage source 12. (The first circuit breaker 7, being located up-line of the first recloser 16 in relation to the fault, does not sense the overcurrent condition and therefore remains in its "closed" position.)

The controller 30 causes the interrupting mechanism 28 to close after a predetermined interval, e.g., approximately 0.5 seconds, after the initial trip. The reoccurrence of the permanent fault upon closure of the interrupting mechanism 28 causes the controller 30 to again trip the interrupting mechanism 28.

The I/O interface 66 of the controller 11, as noted above, receives the recloser count from the first recloser 16, i.e., the number of times the interrupting mechanism 28 of the recloser 16 has closed and reopened following the occurrence of a fault, by way of the communication link 53. The computer-executable instructions 64 of the controller 11 thus update the recloser count for the recloser 16 to one (from its initial value of zero) as the interrupting mechanism 28 causes the controller 30 to trip the interrupting mechanism 28 following the initial re-closing.

The controller 11, through the computer-executable instructions 64, identifies the section of the power-distribution network 10 in which the fault is present in the above-described manner, i.e., by identifying the last-forward switching device and the first-backward switching device.

In this particular example, the first recloser 16 experiences a substantial decrease in line voltage and a substantial increase in line current as a result of the fault. The first and second sectionalizers 22, 24 each experience a substantial decrease in both line voltage and line current (or a substantial increase in line current and a reversal of power flow if a rotating-machinery-type load is coupled to the first section 23 of the distribution feeder 14) as a result of the fault. (The third recloser 26, which is open during normal operation of the power-distribution network 10, does not experience any substantial change in line voltage or line current.)

The control unit 11 thus recognizes the first recloser 16 as the last-forward switching device, and the first sectionalizer 22 as the first-backward switching device. The control unit 11 also recognizes the first section 23, i.e., the section of the power-distribution network 10 located between the last-forward switching device and the first-backward switching device, as the faulted section.

The controller 30 again causes the interrupting mechanism 28 to close after a predetermined interval, e.g., approximately 15 seconds, after the initial trip. The reoccurrence of the permanent fault upon closure of the interrupting mechanism 28 causes the controller 30 to again trip the interrupting mechanism 28. The controller 11 updates the recloser count for the recloser 16 to two as the interrupting mechanism 28 causes the controller 30 to trip the interrupting mechanism 28 following the second re-closing. The control unit 11 once again recognizes the first recloser 16 as the last-forward switching device, the first sectionalizer 22 as the first-backward switching device, and the first section 23 as the faulted section.

The controller 30 again causes the interrupting mechanism 28 to close after a predetermined interval, e.g., approximately 45 seconds, after the initial trip. The reoccurrence of the permanent fault upon closure of the interrupting mechanism 28 causes the controller 30 to again trip the interrupting mechanism 28. The controller 11 updates the recloser count for the recloser 16 to three as the interrupting mechanism 28 causes the controller 30 to trip the interrupting mechanism 28 following the third re-closing. The control unit 11 once again recognizes the first recloser 16 as the last-forward switching device, the first sectionalizer 22 as the first-backward switching device, and the first section 23 as the faulted section.

The first recloser 16 is configured to carry out three re-closings. The controller 30 of the recloser 16 causes the interrupting mechanism 28 to remain in the "open" position after the third re-closing and opening, i.e., if the fault has not cleared after three re-closings. The second and third closings, or "shots," of the recloser 16 are performed in an attempt to clear any transient faults that may occur in the distribution feeder 14. (Multiple shots must often be used to clear transient faults.) Alternative embodiments of the recloser 16 may perform one, two, or more than three shots.

The control unit 11 isolates the faulted section and restores power to the un-faulted sections of the distribution feeder 14 after the recloser count reaches three. More particularly, the control unit 11 recognizes the fault as being present in the first section 23 of the distribution feeder 14, as noted above. The computer-executable instructions 64 of the control unit 11, in response, generate an "open" command. The "open" command is sent to the controller 47 of the first sectionalizer 22 by the I/O interface 66.

The controller 47 of the first sectionalizer 22, upon receiving the "open" command, causes the switch 45 of the sectionalizer 22 to move to the "open" position, thereby isolating the fist section 23 of the distribution feeder 14 from the second section 25. The control unit 11, through the computer-executable instructions 64 and the I/O interface 6, also generates and sends a "lock-out" command to the controller 30 of the first recloser 16. The lock-out command causes the interrupting mechanism 28 of the recloser 16 to remain in the "open" position, and thus ensures that the first section 23 remains isolated from the first voltage source 12.

The control unit 11, through the computer-executable instructions 64, makes a decision whether to re-energize the second and third sections 25, 27 of the distribution feeder 14 based on the load conditions in the first and second distribution feeders 14, 15 at the time of the fault. More specifically, the control unit 11 adds the electrical loads being drawn through the first and second sectionalizers 22, 24 at the time of the fault to the electrical load being drawn through the second recloser 17 at the time the fault. The resulting sum represents the total estimated load that will be placed on the second voltage source 13 if the second and third sections 25, 27 of the first distribution feeder 14 are re-energized using the second voltage source 13. The control unit 11 compares the total estimated load to the capacity of the second voltage source 13. The control unit 11 takes no further action if the second voltage source 13 does not have sufficient capacity to supply the total estimated load.

The control unit 11 reconfigures the power-distribution network 10 as follows if the second voltage source 13 has sufficient capacity to supply the total anticipated load. The computer-executable instructions 64 generate a "reverse-polarity" command, and the I/O interface 66 sends this command to the controller 47 of the second sectionalizer 24. The "reverse-polarity" command causes the sectionalizer 24 to reconfigure itself to transmit line current in a direction opposite the direction of transmission prior to the occurrence of the fault, i.e., the sectionalizer 24 reconfigures itself to transmit current from the third section 27 to the second section 25 of the first distribution feeder 14.

The computer-executable instructions 64 verify that the third sectionalizer 26 is configured to transmit current from the third section 52 of the second distribution feeder 15 to the third section 27 of the first distribution feeder 14. The control unit 11, through the computer-executable instructions 64 and the I/O interface 66, sends a "reverse polarity" command to the third sectionalizer 26 if the third sectionalizer 26 is not configured in the manner.

The control unit 11, through the computer-executable instructions 64 and the I/O interface 66, subsequently generates and sends a "close" command to the third sectionalizer 26. The closing of the switch 45 establishes electrical contact between the third section 27 of the first distribution feeder 14 and the third section 52 of the second distribution feeder 15. This arrangement causes the second and third sections 25, 27 of the first distribution feeder 14 to be energized by the second voltage source 13 by way of the second distribution feeder 15.

The occurrence of a permanent fault in the section 25 of the distribution feeder 14 causes the following sequence of event in the network 10 (see FIGS. 5A and 5B).

A permanent fault in the second section 25 is initially sensed as an overcurrent condition by the controller 30 of the first recloser 16. The controller 30, in response, causes the interrupting mechanism 28 of the recloser 16 to trip, or open, thereby clearing the fault temporarily and isolating the first distribution feeder 14 from the first voltage source 12. The first recloser 16 carries out the sequence of three re-closings and openings as described above in relation to the first fault scenario.

In this particular example, the first recloser 16 and the first sectionalizer 22 each experience a substantial decrease in line voltage and a substantial increase in line current as the fault reoccurs upon each re-closing of the recloser 16. The second sectionalizer 24 experiences a substantial decrease in both line voltage and line current (or a substantial decrease in line voltage and a reversal of power flow if a rotating-machinery-type load is coupled to the second section 25 of the distribution feeder 14) as a result of the fault. (The third recloser 26, which is open during normal operation of the power-distribution network 10, does not experience any substantial change in line voltage or line current.)

The computer-executable instructions 64 of the control unit 11 thus recognize the first sectionalizer 22 as the last-forward switching device, and the second sectionalizer 24 as the first-backward switching device. The computer-executable instructions 64 also recognize the second section 25, i.e., the section of the power-distribution network 10 located between the last-forward switching device and the first-backward switching device, as the faulted section.

The control unit 11 isolates the faulted section and restores power to the un-faulted sections of the distribution feeder 14 after the recloser count reaches three. More particularly, the computer-executable instructions 64 recognize the fault as being present in the second section 25 of the distribution feeder 14, as noted above. The computer-executable instructions 64, in response, generate an "open" command. The "open" command is sent to the first and second sectionalizers 22, 24 by the I/O interface 66. The controllers 47 of the first and second sectionalizers 22, 24, upon receiving the "open" command, cause the respective switches 45 of the sectionalizers 22, 24 to move to the "open" position, thereby isolating the second section 25 of the distribution feeder 14 from the first and third sections 21, 27.

The control unit 11, through the computer-executable instructions 64 and the I/O interface 66, subsequently generates and sends a "close" command to the controller 30 of the first recloser 16. The controller 30, in response, closes the interrupting mechanism 28 of the recloser 16. Closing the interrupting mechanism 28 establishes electrical contact between the first section 23 of the distribution feeder 14 and the first voltage source 12, and thereby energizes the first section 23.

The computer-executable instructions 64 make a decision whether to re-energize the third section 27 of the distribution feeder 14 based on the load conditions in the first and second distribution feeders 14, 15 at the time of the fault. More specifically, the computer-executable instructions 64 add the electrical loads being drawn through the second sectionalizer 24 at the time of the fault to the electrical load being drawn through the second recloser 17 at the time the fault. The resulting sum represents the total estimated load that will be placed on the second voltage source 13 if the third section 27 of the first distribution feeder 14 is re-energized using the second voltage source 13. The computer-executable instructions 64 compare the total estimated load to the capacity of the second voltage source 13. The control unit 11 takes no further action if the second voltage source 13 does not have sufficient capacity to supply the total estimated load.

The control unit 11 reconfigures the power-distribution network 10 as follows if the second voltage source 13 has sufficient capacity to supply the total anticipated load. The computer-executable instructions 64 verify that the third sectionalizer 26 is configured to transmit current from the third section 52 of the second distribution feeder 15 to the third section 27 of the first distribution feeder 14. The control unit 11, through the computer-executable instructions 64 and the I/O interface 66, generates and sends a "reverse polarity" command to the third sectionalizer 26 if the third sectionalizer 26 is not configured in the manner.

The control unit 11 through the computer-executable instructions 64 and the I/O interface 66, subsequently sends a "close" command to the third sectionalizer 26. The closing of the switch 45 establishes electrical contact between the third section 27 of the first distribution feeder 14 and the third section 52 of the second distribution feeder 15. This arrangement causes the third section 27 of the first distribution feeder 14 to be energized by the second voltage source 13 by way of the second distribution feeder 15.

The occurrence of a permanent fault in the third section 27 of the distribution feeder 14 causes the following sequence of events in the network 10 (see FIGS. 5A and 5B).

A permanent fault in the third section 27 is initially sensed as an overcurrent condition by the controller 30 of the first recloser 16. The controller 30, in response, causes the interrupting mechanism 28 of the recloser 16 to trip, or open, thereby clearing the fault temporarily and isolating the first distribution feeder 14 from the first voltage source 12. The first recloser 16 carries out the sequence of three re-closings and openings as described above in relation to the first fault scenario.

In this particular example, the first recloser 16 and the first and second sectionalizers 22, 24 each experience a substantial decrease in line voltage and a substantial increase in line current as the fault reoccurs upon each re-closing of the recloser 16. (The third recloser 26, which is open during normal operation of the power-distribution network 10, does not experience any substantial change in line voltage or line current.)

The control unit 11 through the computer-executable instructions 64, thus recognizes the second sectionalizer 24 as the last-forward switching device, and the third sectionalizer 26 as the first-backward switching device. The computer-executable instructions 64 also recognize the third section 27, i.e., the section of the power-distribution network 10 located between the last-forward switching device and the first-backward switching device, as the faulted section.

The control unit 11 isolates the faulted section and restores power to the un-faulted sections of the distribution feeder 14 after the recloser count reaches three. More particularly, the computer-executable instructions 64 recognize the fault as being present in the third section 27 of the distribution feeder 14, as noted above. The computer-executable instructions 64, in response, generate an "open" command. The I/O interface 66 sends the "open" command to the second sectionalizer 24. The controller 47 of the second sectionalizer 24, upon receiving the "open" command, causes the switch 45 of the sectionalizer 24 to move to the "open" position, thereby isolating the third section 27 of the distribution feeder 14 from the second section 25. The third section 27 of the distribution feeder 14 is isolated from the third section 52 of the second distribution feeder 15 by the sectionalizer 26 which, as noted above, is normally "open."

The control unit 11, through the computer-executable instructions 64 and the I/O interface 66, subsequently generates and sends a "close" command to the controller 30 of the first recloser 16. The controller 30, in response, closes the interrupting mechanism 28 of the recloser 16. Closing the interrupting mechanism 28 establishes electrical contact between the first section 23 of the distribution feeder 14 and the first voltage source 12, and thereby energizes the first and second sections 23, 25 of the first distribution feeder 14.

The control unit 11 identifies and isolates faults in the first, second, and third sections 48, 50, 52 of the second distribution feeder 15 in a manner substantially similar to hat described above in relation to the respective first, second, and third sections 23, 25, 27 of the first distribution feeder 14. Moreover, the control unit 11 reconfigures the second recloser 17 and the third, fourth, and fifth sectionalizers 26, 42, 44 so as to re-energize the second and third sections 50, 52 of the second distribution feeder 15 using the first voltage source 12, in a manner substantially similar to that described above in relation to the re-energization of the second and third sections 25, 27 of the first distribution feeder 14 using the second voltage source 12.

The control unit 11 and the switching devices thus act as an adaptive protection system for the power-distribution network 10. More particularly, the control unit 11 receives inputs from the switching devices and, based on those inputs, can identify the presence and location of a fault in the power-distribution network 10. The control unit 11 generates responsive outputs that, when received by the switching devices, cause the power-distribution network 10 to reconfigure itself so as to isolated the faulted section and re-energize the un-faulted sections of the power-distribution network 10.

Placing a substantial entirety of the decision-making authority for the above functions in the control unit 11 provides substantial advantages. For example, a substantial entirety of the hardware, firmware, and software needed to carry out the noted functions can reside in the control unit 11, rather than in each individual switching device. Hence, the control unit 11 obviates the need to procure and maintain multiple units of hardware, firmware, and software to enable each individual switching device to perform the decision-making processes required to isolate faults and re-energize un-faulted sections of the power-distribution network 10.

Moreover, the use of a centralized controller such as the control unit 11 facilitates communication with a central data base or monitoring station. In particular, the use of the control unit 11 to monitor and control the switching devices, and to determine the location of a fault in the power-distribution network 10, permits the status of the power-distribution network 10 to be transmitted to a central date base or monitoring station by way of a single, cost-effective data link, e.g., the SCADA data link 51. Hence, the utility company that operates the power distribution network 10 can readily track the status, maintenance requirements, operating history, load conditions, etc. of the power distribution network 10.

Moreover, the power distribution network 10, in conjunction with the switching devices, can isolate a faulted section of the power-distribution network 10, and can restore power to all of the un-faulted sections regardless of the location of the faulted section (provided an alternative voltage source of sufficient capacity is available). In other words, the power distribution network 10 de-energizes only the faulted section of the power distribution network 10.

Moreover, the control unit 11 is capable of clearing transient faults occurring in the distribution feeder 14. In particular, the control unit 11, as noted above, can be programmed so that the recloser 16 or the recloser 17 undergo multiple shots before the control unit 11 initiates any action to isolate a faulted section of the power-distribution network 10. Transient faults, as noted above, can often be cleared by cycling the reclosers 16, 17 though multiple shots. Prolonged power outages and unnecessary service calls can thus be avoided through the use of this feature.

Furthermore, a conventional, readily-available programmable-logic controller can be programmed and used as the control unit 11. Moreover, the control unit 11 can readily be integrated into the power-distribution network 10, and adds minimally to the overall number of components and the complexity of the power-distribution network 10. Also, the control unit 11 can identify and isolate a faulted section of the power-distribution network 10 using only one shot of the recloser 16 or the recloser 17. Hence, the control unit 11, in conjunction with the switching devices, can restore power to un-faulted sections of the power-distribution network 10 more quickly than the previously-described conventional protections systems that require multiple shots to identify and isolate a faulted section.

It is to be understood that even though numerous characteristics and advantages of the present invention have been set forth in the foregoing description, the disclosure is illustrative only and changes can be made in detail within the principles of the invention to the full extent indicated by the broad general meaning of the terms in which the appended claims are expressed.

For example, a particular configuration of the power-distribution network 10 has been described in detail for exemplary purposes only. The control unit 11 can be used in power-distribution networks of virtually any type and configuration, including power-distribution networks that using more or less than the two reclosers 16, 17 and the five sectionalizers 22, 24, 26, 42, 44 of the power-distribution network 10.

Moreover, although the control unit 11 bas been described in conjunction with two above-ground, radial distributions feeders 14, 15, the control unit 11 can be used in conjunction with underground distribution feeders, as well as loop-type distribution feeders. Also, alternative types of switching devices can be used in lieu of the first and second reclosers 16, 17 and the first, second, fourth, and fifth sectionalizers 22, 24, 42, 44. For example, reclosers can be used in lieu of the first, second, fourth, and fifth sectionalizers 22, 24, 42, 44 in alternative embodiments.

Alternative embodiments of the power-distribution network 10 may also include alternative (backup) provisions to isolate faulted sections of the power-distribution network 10 in the event the control unit 11, or the communication link 53 between the control unit 11 and the switching devices, become partially or fully inoperative. For example, the sectionalizers 22, 24 can be programmed to open on a sequential basis after the recloser 16 has cycled through a predetermined number of closings and openings, as described above in relation to a conventional protection system.

What is claimed is:

1. A power-distribution network, comprising a plurality of switching devices and a control unit, the control unit comprising a processor, a memory-storage device electrically coupled to the processor, a set of computer-executable instructions stored on the memory-storage device, and an input/output interface electrically coupled to the processor, wherein the control unit:

receives data from the plurality of switching devises;

identifies ones of the switching devices located immediately up-line and down-line of a fault in a faulted section of the power-distribution network based on predetermined characteristics of the data; and generates and sends a first control input to at least one of the switching devices located immediately up-line and down-line of the fault to cause the at least one of the switching devices to open and thereby isolate the faulted section from another section of the power-distribution network.

2. The power-distribution network of claim 1, further comprising a first and a second voltage source, wherein the another section of the power-distribution network is energized by the first voltage source prior to the fault, and the control unit generates and sends a second control input to one of the switching devices located down-line from the faulted section, the second control input causing the one of the switching devices located down-line the faulted section to close so that the another section of the power distribution network is energized by the second voltage source after the fault.

3. The power-distribution network of claim 2, wherein the control unit compares a load condition on the another section prior to the fault with an available load capacity of the second voltage source, and generates and sends the second control input to the one of the switching devices located down-line from the faulted section only if the available load capacity of the second voltage source is sufficient to energize the another section based on the load condition on the another section prior to the fault.

4. The power-distribution network of claim 1, wherein the control unit is communicatively coupled to at least one of a data base and a central monitoring station by way of a data link.

5. The power-distribution network of claim 4, wherein the data link is a SCADA data link.

6. The power-distribution network of claim 1, wherein the at least one of the switching devices located immediately up-line and down-line of the fault comprises a sectionalizer.

7. The power-distribution network of claim 1, wherein the plurality of switching devices comprises a recloser and a sectionalizer.

8. The power-distribution network of claim 1, wherein the control unit comprises a programmable-logic controller.

9. The power-distribution network of claim 1, wherein the data comprises a loading condition on the plurality of switching devices.

10. The power-distribution network of claim 1, wherein the control unit identifies ones of the switching devices located up-line of the fault based on a substantial decrease in line voltage and a substantial increase in line current in the ones of the switching devices located up-line of the fault.

11. The power-distribution network of claim 1, wherein the control unit identifies ones of the switching devices located down-line of the fault based on one of: (i) a substantial decrease in line current and line voltage in the ones of the switching devices located down-line of the fault, and (ii) a substantial increase in line current and a reversal of power flow in the ones of the switching devices located down-line of the fault.

12. The power-distribution network of claim 1, wherein the control unit receives the following inputs from one of the switching devices comprising a recloser; (i) identification data; (ii) a loading conduction; (iii) a recloser count; (iv) a position of an interrupting mechanism of the recloser; (v) a locked-out status of the recloser; and (vi) a resistance down-line of the recloser.

13. The power-distribution network of claim 12, wherein the control unit generates and sends the following inputs to the one of the switching devices comprising a recloser; (i) an open-close command; and (ii) a "lock-out" command.

14. The power-distribution network of claim 1, wherein the control unit receives the following inputs from one of the switching devices comprising a sectionalizer; (i) identification data; (ii) loading conditions; (iii) an open-closed status of the sectionalizer; and (iv) a resistance down-line of the sectionalizer.

15. The power-distribution network of claim 14, wherein the control unit generates and sends the following inputs to the one of the switching devices comprising a sectionalizer: an open-close command; and (ii) a "reverse polarity" command.

16. The power-distribution network of claim 1, further comprising a central processing unit comprising the processor, the memory-storage device, the computer-executable instructions, and a power supply electrically coupled to the processor and the memory-storage device.

17. A power-distribution network, comprising (i) a central processing unit comprising a processor, a memory-storage device electrically coupled to the processor, and a set of computer-executable instructions stored on the memory-storage device, (ii) an input/output interface electrically coupled to the central processing unit; and (iii) a first and a second switching device, wherein:

the input/output interface receives inputs from the first and second switching devices, the inputs being indicative of a load condition on each of the first and second switching devices;

the central processing unit detects the presence a fault in a first section of the power-distribution network located between the first and second switching devices by comparing the input from the first switching device with the input from the second switching device;

the central processing unit generates a control input in response to the detection of the fault; and the input/output interface sends the control input to at least one of the first and second switching devices, the control input causing the at least one of the first and second switching devices to reconfigure itself to isolate the first section of the power-distribution network from a second section of the power-distribution network.

18. The power-distribution network of claim 17, further comprising a third switching device and first and a second voltage source, wherein the second section of the power-distribution network is energized by the first voltage source prior to the fault, and the central processing unit and the input/output interface generate and send a second control input to the third switching device, the second control input causing the third switching device to open so that the second section of the power-distribution network is energized by the second voltage source after the fault.

19. The power-distribution network of claim 18, wherein the central processing unit compares a load condition on the second section prior to the fault with an available load capacity of the second voltage source, and the and the central processing unit and the input/output interface generate and send the second control input to the third switching device only if the available load capacity of the second voltage source is sufficient to energize the second section based on load condition on the second section prior to the fault.

20. The power-distribution network of claim 17, wherein the central processing unit further comprises a power supply electrically coupled to the processor and the memory-storage device.

21. A power-distribution network, comprising:
a first switching device electrically coupled to a first voltage source and a first section of a first distribution feeder for isolating the first section from the first voltage source in response to an overcurrent condition in the first distribution feeder;
a second switching device electrically coupled to the first section and a second section of the first distribution feeder for isolating the first section from the second section on a selective basis;
a third switching device electrically coupled to the second section and a third section of the first distribution feeder isolating the second section from the third section on a selective basis; and
a control unit comprising a processor, a memory-storage device electrically coupled to the processor, a set of computer-executable instructions stored on the memory-storage device, and an input/output interface, wherein the control unit; (i) communicates with at least the first, second and third switching devices; (ii) detects the presence a fault in one of the first, second and third sections by comparing loading conditions of the first, second, and third switching devices; and (iii) generates and sends a control input to at least one of the second and third switching devices to cause the at least one of the second and third switching devices to isolate one of the first, second, and third sections from another of the fast, second, and third sections.

22. The power-distribution network of claim 21, wherein the first switching device is a recloser.

23. The power-distribution network of claim 21, wherein the second and third switching devices are sectionalizers.

24. The power-distribution network of claim 21, further comprising a second voltage source and a fourth switching device electrically coupled to the second voltage source and the third section, wherein the fourth switching device isolates the third section from the second voltage source on a selective basis.

25. The power-distribution network of claim 24, wherein the control unit communicates with the fourth switching device, and generates and a second control input to the fourth switching device, the second control input causing the fourth switching device t close so that the third section is energized by the second voltage source.

26. The power-distribution network of claim 25, wherein the control unit compares a load condition on the third section prior to the fault with an available load capacity of the second voltage source, and the control unit generates and sends the second voltage source is sufficient to energize the third section based on the load condition on the third section prior to the fault.

27. The power-distribution network of claim 21, further comprising a communication link between the control unit and at least one of the first, second, and third switching devices.

28. The power-distribution network of claim 27, wherein the communication link is a radio communication link.

29. The power-distribution network of claim 26, further comprising:
a fifth switching device electrically coupled to the second voltage source and a first section of a second distribution feeder, the fifth switching device isolating the first section of the second distribution feeder from the second voltage source in response to an overcurrent condition in the second distribution feeder,
a sixth switching device electrically coupled to the first section and a second section of the second distribution feeder the sixth switching device isolating the first section from the second section of the second distribution feeder on a selective basis; and
a seventh switching device electrically coupled to the second section and a third section of the second distribution feeder, seventh switching device isolating the second section from the third section of the second distribution feeder on a selective basis, wherein the fourth switching device is electrically coupled to the third section of the second distribution feeder and the control unit: (i) communicates with the fifth, sixth, and seventh switching devices; (ii) detects the presence a fault in one of the first, second, and third sections of the second distribution feeder by comparing loading conditions of the fifth, sixth, and seventh switching devices; and (iii) generates and sends a control input to at least one of the sixth and seventh switching devices to cause the at least one of the sixth and seventh switching devices to isolate one of the first, second, and third sections of the second distribution feeder from another of the first, second, and third sections of the second distribution feeder.

30. The power-distribution network of claim 21, further comprising a substation, the substation comprising the first voltage source and a circuit breaker electrically coupled to the first voltage source and the first switching device.

31. The power-distribution network of claim 24, further comprising (i) a first substation comprising the first voltage source and a first circuit breaker electrically coupled to the first voltage source and the first switching device, and (ii) a first substation comprising the second voltage source and a second circuit breaker electrically coupled to the second voltage source and the fourth switching device.

32. The control unit of claim 21, further comprising a central processing unit comprising the processor, the memory-storage device, the computer-executable instructions, and a power supply electrically coupled to the processor and the memory-storage device.

33. A power-distribution network comprising:
a first voltage source;
a first switching device electrically coupled to the voltage source;
a second switching device electrically coupled to the first switching device down-line of the first switching device in relation to the first voltage source;
a third switching device electrically coupled to the second switching device down-line of the second switching device in relation to the first voltage source; and
a control unit for; (i) receiving data from at least the second and third switching devices; (ii) detecting a fault in a first section of the power-distribution network located between the second and third switching devices based on predetermined characteristics of the data; and (iii) generating and sending a first control input to at least one of the second and third switching devices to cause the at least one of the second and third switching devices to open and thereby isolate the first section from a second section of the power-distribution network.

34. The power-distribution network of claim 33, further comprising a second voltage source and a fourth switching device located down-line of the third switching device in relation to the first voltage source and electrically coupled to the second voltage source, wherein the control unit generates and sends a second control input to the fourth switching device, the second control input causing the fourth switching device to close so that the second section is energized by the second voltage source.

35. The control unit of claim 34, wherein the control unit compares a load condition on the second section prior to the fault with an available load capacity of the second voltage source, and generates and sends the second control input to the fourth switching device only if the available load capacity of the second voltage source is sufficient to energize the second section based on the load condition on the second section prior to the fault.

36. The control unit of claim 33, further comprising (i) a central processing unit, the central processing unit comprising a processor, a memory-storage device electrically coupled to the processor, a set of computer-executable instructions stored on the memory-storage device, and a power supply electrically coupled to the processor and the memory-storage device, and (ii) an input/output interface device electrically coupled to the central processing unit.

37. The control unit of claim 33, further comprising a substation, the substation comprising the first voltage source, and a circuit breaker electrically coupled to the first voltage source and the first switching device.

* * * * *

UNITED STATES PATENT AND TRADEMARK OFFICE
CERTIFICATE OF CORRECTION

PATENT NO. : 6,816,757 B1
DATED : November 9, 2004
INVENTOR(S) : Jaime De La Ree et al.

It is certified that error appears in the above-identified patent and that said Letters Patent is hereby corrected as shown below:

Column 8,
Lines 24 and 27, "sectionalizer 42" should read -- sectionalizer 40 --

Column 15,
Line 64, "hat" should read -- that --

Column 17,
Line 55, "devises" should read -- devices --

Column 18,
Line 34, "loading" should read -- load --
Line 52, "conduction" should read -- condition --

Column 20,
Line 33, "device t close" should read -- device to close --
Line 39, "sends the second voltage source" should read -- sends the second control input to the fourth switching device only if the available load capacity of the second voltage --

Signed and Sealed this

Fifteenth Day of March, 2005

JON W. DUDAS
*Director of the United States Patent and Trademark Office*